United States Patent
Oshima (10) Patent No.: US 11,214,122 B2
(45) Date of Patent: Jan. 4, 2022

(54) AIR CONDITIONING DEVICE FOR FUEL CELL VEHICLE

(71) Applicant: Toyota Jidosha Kabushiki Kaisha, Toyota (JP)

(72) Inventor: Ryo Oshima, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 171 days.

(21) Appl. No.: 16/681,008

(22) Filed: Nov. 12, 2019

(65) Prior Publication Data
US 2020/0180402 A1 Jun. 11, 2020

(30) Foreign Application Priority Data

Dec. 10, 2018 (JP) .............................. JP2018-231158

(51) Int. Cl.
| | |
|---|---|
| *B60H 1/14* | (2006.01) |
| *B60H 1/00* | (2006.01) |
| *B60H 1/22* | (2006.01) |

(52) U.S. Cl.
CPC ......... *B60H 1/143* (2013.01); *B60H 1/00271* (2013.01); *B60H 1/00392* (2013.01); *B60H 1/00735* (2013.01); *B60H 1/00878* (2013.01); *B60H 1/22* (2013.01); *B60H 2001/00942* (2013.01)

(58) Field of Classification Search
CPC ................ B60H 1/143; B60H 1/00271; B60H 1/00392; B60H 1/00735; B60H 1/00878; B60H 1/22; B60H 2001/00942
See application file for complete search history.

(56) References Cited

U.S. PATENT DOCUMENTS

| | | | |
|---|---|---|---|
| 2001/0018832 A1 | 9/2001 | Matsunaga et al. | |
| 2007/0298298 A1* | 12/2007 | Ishigaki | H01M 8/04225 429/429 |
| 2009/0283604 A1* | 11/2009 | Martinchick | B60H 1/00392 237/12.3 B |
| 2012/0118988 A1* | 5/2012 | Lee | B60L 58/34 237/12.3 R |
| 2016/0141680 A1* | 5/2016 | Yamada | H01M 8/04037 429/437 |

FOREIGN PATENT DOCUMENTS

| | | |
|---|---|---|
| JP | 2001-315524 A | 11/2001 |
| JP | 2011-098670 A | 5/2011 |

* cited by examiner

*Primary Examiner* — Marc E Norman
(74) *Attorney, Agent, or Firm* — Dinsmore & Shohl LLP (57) ABSTRACT

An conditioning device for a fuel cell vehicle includes a heater core configured to heat air in a vehicle cabin with a coolant to be discharged from a FC stack cooled by the coolant as a heat source, a coolant heating heater configured to heat the coolant, an air heating heater configured to further heat air warmed by the heater core, and a vehicle ECU configured to, in a case where a heater core outlet coolant temperature based on a target blowing temperature is equal to or higher than an FC stack inlet target temperature, perform control such that the air heating heater is operated with an output set based on the heater core outlet coolant temperature, and the coolant heating heater is operated with an output set based on a heater core inlet target coolant temperature calculated according to the set output of the air heating heater.

4 Claims, 6 Drawing Sheets

AIR CONDITIONING DEVICE FOR FUEL CELL VEHICLE

CROSS-REFERENCE TO RELATED APPLICATIONS

This application claims priority to Japanese Patent Application No. 2018-231158 filed on Dec. 10, 2018, which is incorporated herein by reference in its entirety including the specification, drawings and abstract.

BACKGROUND

1. Technical Field

The present disclosure relates to an air conditioning device for a fuel cell vehicle.

2. Description of Related Art

A fuel cell vehicle travels, as an example, with electric power obtained by a fuel cell (hereinafter, abbreviated as "FC") in which hydrogen as fuel is made to react with oxygen in air. Since the reaction of hydrogen and oxygen is an exothermic reaction, the FC during electric power generation is at a higher temperature than an external environment. Since the FC has a temperature range optimum for electric power generation, cooling, is needed such that the temperature of the FC falls within the optimum temperature range. Cooling is also needed in order to restrain the FC itself from being damaged due to heat. As an example, in the fuel cell vehicle, the FC is cooled with a coolant as a refrigerant like a vehicle mounted with an internal combustion engine.

Cooling of the FC causes an increase in the temperature of the coolant as a refrigerant. In the fuel cell vehicle, there is a case where the coolant warmed by the FC is used for a heat source of heating the inside of a vehicle cabin. Such use of the coolant is similar to a case where, in a vehicle mounted with an internal combustion engine, a coolant warmed by the internal combustion engine is used for a heat source of heating the inside of a vehicle cabin.

However, since the temperature range optimum for the operation of the FC is lower than a temperature of the coolant of the internal combustion engine in operation, there is a problem in that it is difficult to heat the inside of the vehicle cabin solely with exhaust heat of the FC.

Japanese Unexamined Patent Application Publication No. 2011-098670 (JP 2011-098670 A) discloses an air conditioning device for a vehicle that, in a case where a temperature of a coolant to be introduced into a heater core is low, the coolant to be a heat source of heating is heated using a coolant heating heater, and air flowing through a duct of the air conditioning device is heated by an air heating heater.

SUMMARY

However, in the air conditioning device for a vehicle disclosed in JP 2011-098670 A, there is a concern that, in a case where the coolant is heated by the coolant heating heater in order to fulfill heating of the inside of the vehicle cabin, the temperature of the coolant after overheating exceeds a target value of a coolant inlet temperature of the FC. In such a case, since there is a need to cool the warmed coolant by a radiator, and then, supply the coolant to the FC, the coolant heated by the coolant heating heater is cooled by the radiator, and it is hard to say that energy efficiency is excellent. As a result, there is a concern that the fuel efficiency of the fuel cell vehicle is deteriorated.

The disclosure provides an air conditioning device for a fuel cell vehicle having excellent energy efficiency.

An aspect of the disclosure relates to an air conditioning device for a fuel cell vehicle. The air conditioning device includes a fuel cell, a heater core, a coolant heating heater, an air heating heater, and a controller. The fuel cell is configured to be cooled by a coolant circulating in a coolant passage. The heater core is provided on the coolant passage and is configured to heat air in a vehicle cabin with the coolant discharged from the fuel cell as a heat source. The coolant heating heater is provided on the coolant passage between the fuel cell, and the heater core and is configured to heat the coolant. The air heating heater is configured to further heat the air heated by the heater core. The controller is configured to, in a case where an estimated temperature of the coolant at a coolant outlet of the heater core based on an air conditioning set temperature is equal to or higher than a target temperature of the coolant at a coolant inlet of the fuel cell, perform control such that the air heating heater is operated with an output set based on the estimated temperature of the coolant at the coolant outlet of the heater core, and the coolant heating heater is operated with an output set based on the target temperature of the coolant at the coolant inlet of the heater core calculated according to the set output of the air heating heater.

According to the aspect, in a case where the air conditioning set temperature such that the estimated temperature of the coolant at the coolant outlet of the beater core estimated based on the air conditioning set temperature becomes equal to or higher than the target temperature of the coolant at the coolant inlet of the fuel cell is high, the air heating heater having more excellent heat efficiency than the coolant heating heater is operated, a shortage of heating by the coolant of the fuel cell and the air heating heater is supplemented with the operation of the coolant heating heater, whereby it is possible to heat the inside of the vehicle cabin in a state in which the energy efficiency of the vehicle is excellent.

In the air conditioning device according to the aspect of the disclosure, the controller may be configured to, in a case where the estimated temperature of the coolant at the coolant outlet of the heater core is lower than the target temperature of the coolant at the coolant inlet of the fuel cell, perform control such that the coolant heating heater is operated with an output set based on the target temperature of the coolant at the coolant inlet of the heater core calculated based on the air conditioning set temperature.

According to the aspect, in a case where the air conditioning set temperature such that the estimated temperature of the coolant, at the coolant outlet of the heater core estimated based on the air conditioning set temperature becomes lower than the target temperature of the coolant at the coolant inlet of the fuel cell is low, control for operating the coolant heating heater while prohibiting the operation of the air heating heater causing an increase in a load of the air conditioning device is performed, whereby the reliability of the air conditioning device for the fuel cell vehicle is secured.

In the air conditioning device according to the aspect of the disclosure, the controller may be configured to estimate the estimated temperature of the coolant at the coolant outlet of the heater core based on the target temperature of the coolant at the coolant inlet of the heater core calculated based on the air conditioning set temperature, an outside air temperature, and an output of a blower of the air conditioning device.

According to the aspect, it is possible to estimate the estimated temperature of the coolant at the coolant outlet of the heater core based on the air conditioning set temperature, the outside air temperature, and the output of the blower of the air conditioning device as measured values.

In the air conditioning device according to the aspect of the disclosure, the controller may, configured to process a difference between the target temperature of the coolant at the coolant inlet of the heater core and a temperature of the coolant at the coolant inlet of the heater core detected by a coolant temperature sensor through proportional control and differential control to set an output of the coolant heating heater.

According to the aspect, the differential control is used along with the proportional control, whereby it is possible to set the output of the coolant heating heater with high accuracy.

According to the aspect of the disclosure, it is possible to provide an air conditioning device for a fuel cell vehicle having excellent energy efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
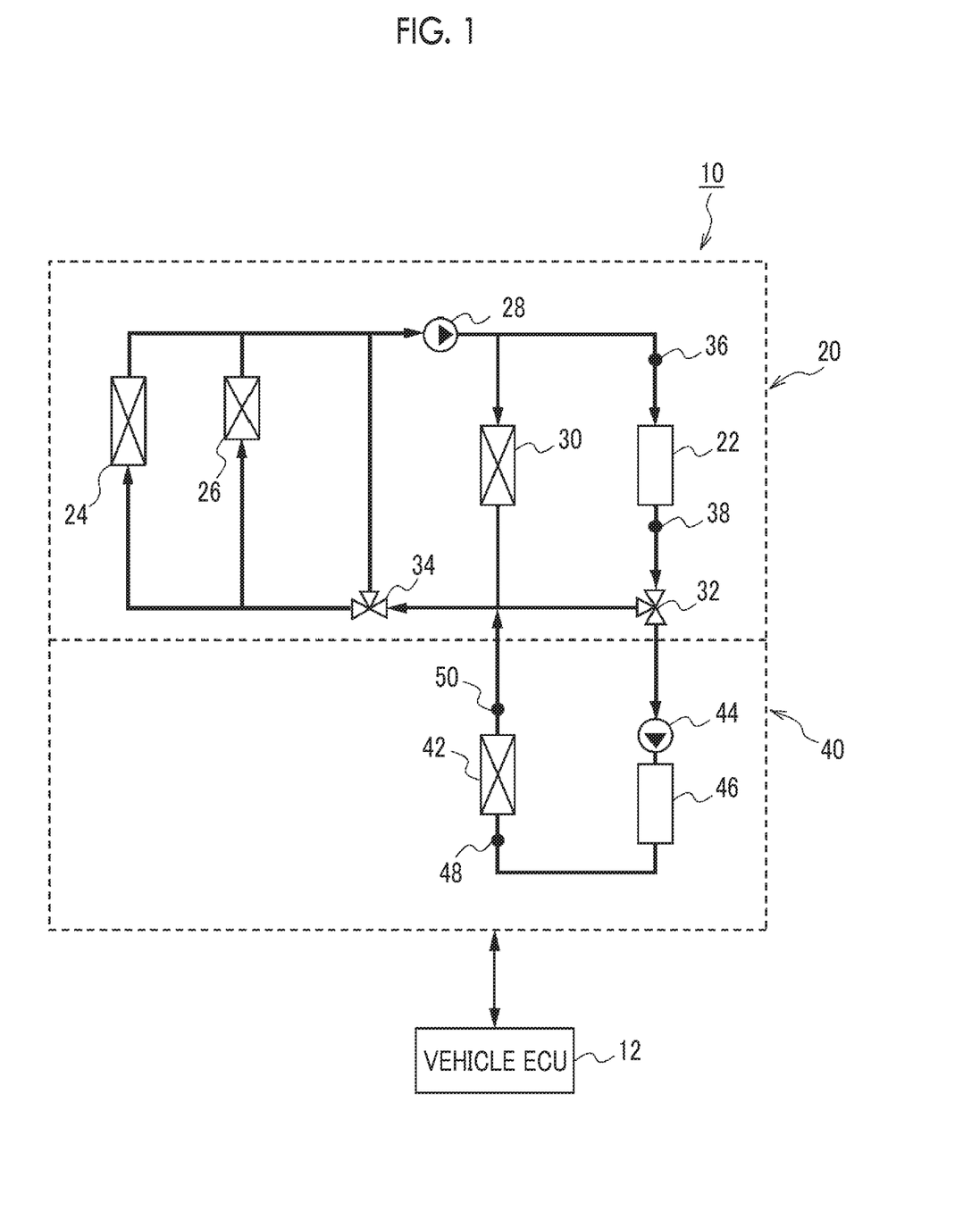
FIG. 1 is a block diagram showing, an example of an air conditioning device for a fuel cell vehicle according to an embodiment.

Hereinafter, an air conditioning device 10 for a fuel cell vehicle according to an embodiment will be described referring to FIGS. 1 to 8. FIG. 1 is a block diagram showing an example of the configuration of the air conditioning device 10 for a fuel cell vehicle (hereinafter, abbreviated as "air conditioning device 10") according to the embodiment. The air conditioning device 10 shown in FIG. 1 is a device that uses exhaust heat of an PC stack 22 formed by laminating a plurality of PCs for heating the inside of a vehicle cabin.

As shown in FIG. 1, the air conditioning device 10 has an PC cooling circuit 20 that is a coolant passage including the PC stack 22, a main radiator 24, a sub-radiator 26, and an intercooler 30, a heater circuit 40 that is a coolant passage including a heater core 42 and a coolant heating heater 46, and a vehicle electronic control unit (ECU) 12 that controls the configurations included in the FC cooling circuit 20 and the heater circuit 40.

The FC cooling circuit 20 further includes a water pump 28 that circulates a coolant in the FC cooling circuit 20, an air conditioning three-way valve 32 that changes a flow channel of the coolant in the FC cooling circuit 20, a radiator valve 34, an PC stack inlet coolant temperature sensor 36 that detects a coolant temperature at a coolant inlet of the PC stack 22, and an PC stack outlet coolant temperature sensor 38 that detects a coolant temperature at a coolant outlet of the FC stack 22.

The heater circuit 40 further includes a water pump 44 that circulates the coolant discharged from the coolant outlet of the FC stack 22 in the coolant heating heater 46 and the heater core 42, a heater core inlet coolant temperature sensor 48 that detects a coolant temperature at a coolant inlet of the heater core 42, and a heater core outlet coolant temperature sensor 50 that detects a coolant temperature at a coolant outlet of the heater core 42.

The air conditioning three-way valve 32 is an electromagnetic valve that is able to switch a flow channel of the coolant discharged from the coolant outlet of the PC stack 22 between a case where the coolant passes through the heater circuit 40 and a case where the coolant passes through the radiator valve 34. The air conditioning three-way valve 32 is controlled by the vehicle ECU 12 such that the coolant flows toward the radiator valve 34 in a case where a temperature of the inside of the vehicle cabin is high and heating is not needed, and such that the coolant flows into the heater circuit 40 in a case where heating is needed.

The radiator valve 34 is an electromagnetic valve that is able to switch a flow channel of the coolant discharged from each of the coolant outlet of the FC stack 22 and the coolant outlet of the heater core 42 between a case where the coolant passes through the main radiator 24 and the sub-radiator 26 (hereinafter, abbreviated as "radiators 24, 26") and a case where the coolant does not pass through the radiators 24, 26, The radiator valve 34 is controlled by the vehicle ECU 12 such that the coolant discharged from each of the coolant outlet of the PC stack 22 and the coolant outlet of the heater core 42 flows through the radiators 24, 26 in a case where the coolant temperature detected by the PC stack inlet coolant temperature sensor 36 is equal to or higher than an upper limit of a temperature range optimum for cooling the FC stack 22.

The radiator valve 34 is controlled by the vehicle ECU 12 such that the coolant discharged from each of the coolant outlet of the FC stack 22 and the coolant outlet of the heater core 42 flows through the intercooler 30 and the PC stack 22 arranged in parallel with each other without passing through the radiators 24, 26 in a case where the coolant temperature detected by the PC stack inlet coolant temperature sensor 36 is equal to or lower than the upper limit and equal to or higher than a lower limit of the temperature range optimum for cooling the FC stack 22.

The intercooler 30 is a cooler having capacity smaller than the radiators 24, 26. As described above, in a case where the coolant temperature detected by the PC stack inlet coolant temperature sensor 36 is equal to or lower than the upper limit and equal to or higher than the lower limit of the temperature range optimum for cooling the PC stack 22, the intercooler 30 cools the FC stack 22 so as to maintain the temperature of the warmed coolant within the temperature range optimum for cooling the FC stack 22.

The coolant heating heater 46 of the heater circuit 40 heats the coolant discharged from the coolant outlet of the FC stack 22 to increase the coolant temperature to such an extent that the coolant is able to be used as a heat source of heating the inside of the vehicle cabin. The coolant heated by the coolant heating heater 46 flows through the heater core 42, and the heater core 42 warms outside air introduced from the outside of the vehicle cabin or inside air circulating in the vehicle cabin.

The vehicle ECU 12 control s the outputs of the coolant heating heater 46 and an air heating heater 64 described below based on the coolant temperatures detected by the FC stack inlet coolant temperature sensor 36, the FC stack outlet coolant temperature sensor 38, the heater core inlet coolant temperature sensor 48, and the heater core outlet coolant temperature sensor 50, and controls the opening and closing of the air conditioning three-way valve 32 and the radiator valve 34.

Figure 2:
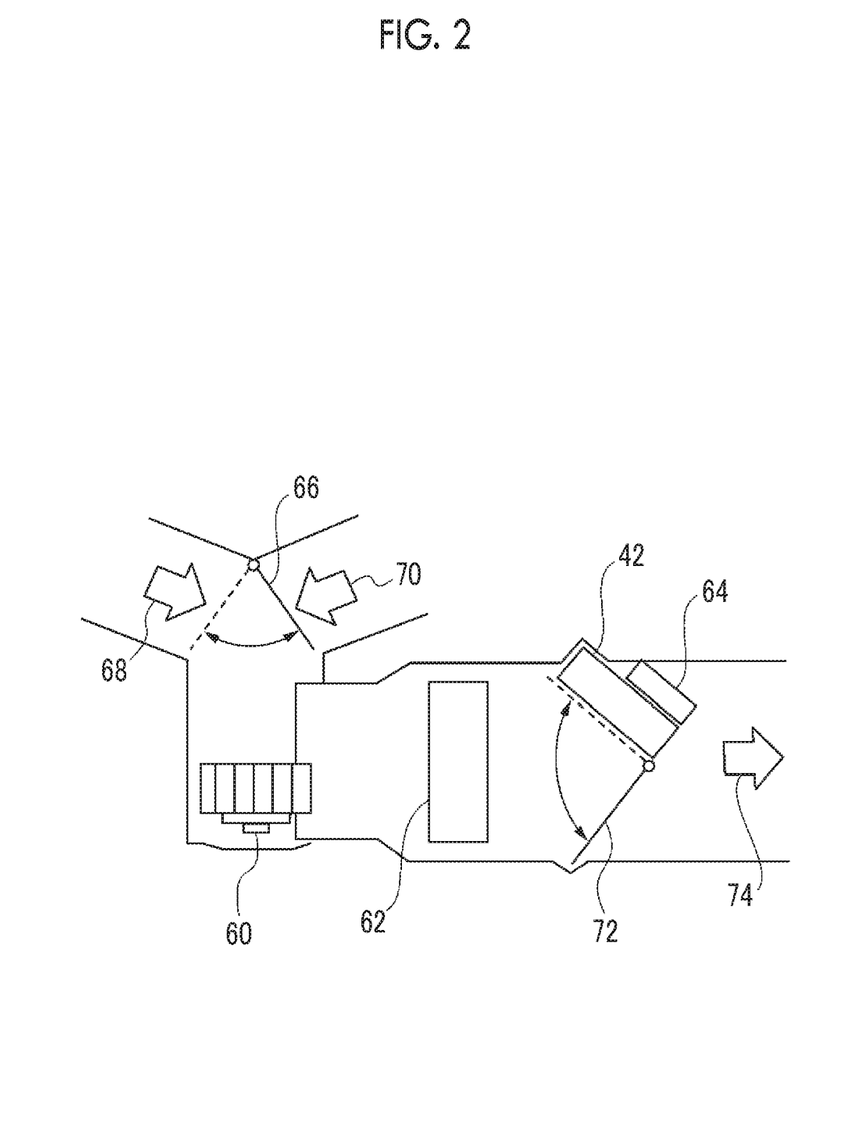
FIG. 2 is a schematic view showing an example of a duct, through which air flows, of the air conditioning device according to the embodiment.

FIG. 2 is a schematic view showing an example of a duct, through which air flows, of the air conditioning device 10 according to the embodiment. As shown in FIG. 2, the duct of the air conditioning device 10 according to the embodiment rotates the AC blower 60 to blow introduced outside air 68 or inside air 70 circulating in the vehicle cabin as blown air into the vehicle cabin through an evaporator 62, the heater core 42, and the air heating heater 64. The duct has an inside-outside air damper 66 that is able to switch between introduction of outside air 68 upstream of the AC blower 60 and circulation of inside air 70.

In a case of cooling or dehumidification of the inside of the vehicle cabin, the evaporator 62 gasifies a liquid refrigerant compressed by a compressor (not shown), thereby cooling air passing through the duct and aggregating moisture included in air due to cooling and dehumidifying. Moisture aggregated by the evaporator 62 is discharged outside the vehicle by way of a discharge passage (not shown).

An air mix damper 72 that is able to switch whether or not to eject air of the duct into the vehicle cabin through the heater core 42 is provided in a pre-stage of the heater core 42. The air mix damper 72 is switched to a state indicated by a dotted line of FIG. 2 in a case where heating is not needed, thereby inhibiting introduction of air into the heater core 42. In a case where heating is needed, the air mix damper 72 is switched to a state indicated by a solid line of FIG. 2, thereby introducing air into the heater core 42. The air mix damper 72 is brought into a state between the state indicated by the solid line of FIG. 2 and the state indicated by the dotted line, thereby introducing a part of air passing through the duct into the heater core 42. As a result, it is possible to adjust the temperature of blown air 74.

The air heating heater 64 is a device that generates heat with electrical conduction in a case where heating of air is not sufficient in the heater core 42. As described below; the output of the air heating heater 64 is controlled by the vehicle ECU 12 based on the coolant temperatures detected by the heater core inlet coolant temperature sensor 48 and the like.

Figure 3:
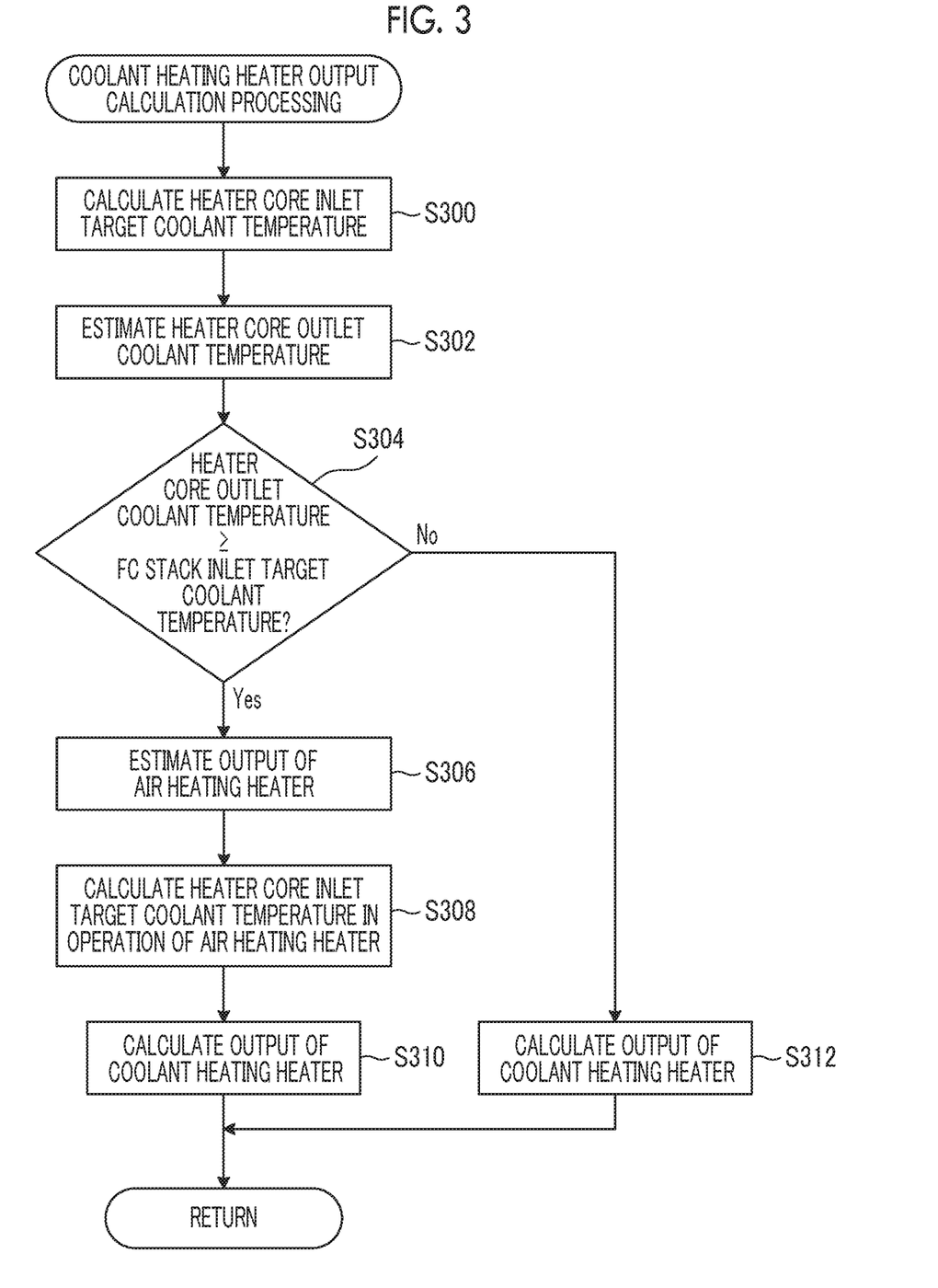
FIG. 3 is a flowchart showing an example of output calculation processing of a coolant heating heater in the air conditioning device according to the embodiment.

Next, the operation of the air conditioning device 10 according to the embodiment will be described, FIG. 3 is a flowchart showing an example of output calculation processing of the air heating heater 64 and the coolant heating beater 46 in the air conditioning device 10 according to the embodiment. The coolant heating heater output calculation processing shown in FIG. 3 is executed in each control cycle of the vehicle ECU 12 in a case where heating of the vehicle is operated.

In Step S300, a heater core inlet target coolant temperature (TACO) is calculated based on a target blowing temperature (TAO). TAO is a target value of blown air 74 and is set based on an operation of the air conditioning device 10 by an occupant of the vehicle. For example, TAO becomes higher m a case where a temperature setting of the air conditioning device 10 is high, and TAO becomes lower in a case where the temperature setting of the air conditioning device 10 is low. THCO is a target value of the coolant temperature at the inlet of the heater core 42 needed for implementing the set TAO. Since TAO and THCO have a correlation relationship, in Step S300, THCO is calculated based on the correlation relationship.

Figure 4:
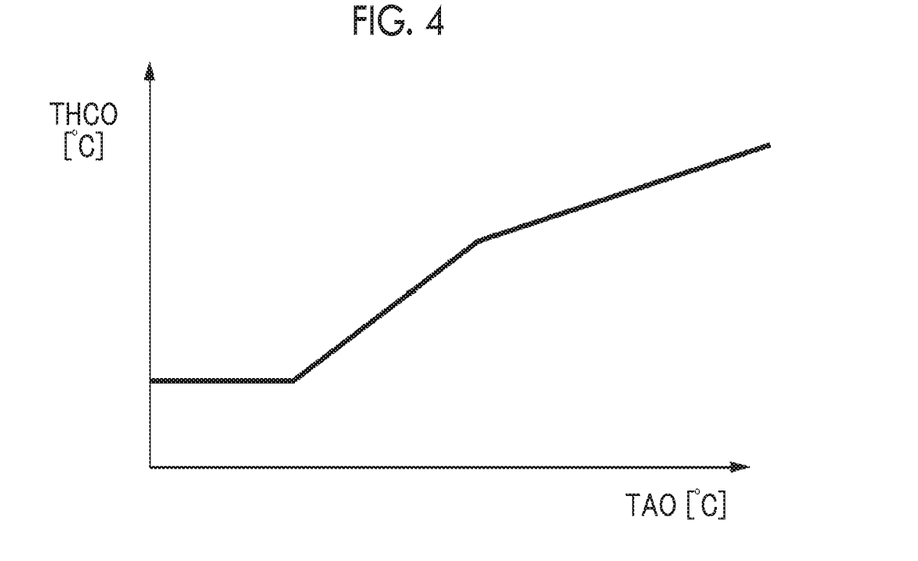
FIG. 4 is a schematic view showing an example of change of a heater core inlet target coolant temperature (THCO) to a target blowing temperature (TAO)

FIG. 4 is a schematic view showing an example of change of THCO to TAO. In Step S300, THCO with respect to TAO is calculated using FIG. 4. As shown in FIG. 4, THCO monotonously increases to TAO. Since an aspect of change of THCO to TAO is different depending on the specification of the air conditioning device 10, an aspect of change of THCO to TAO shown in FIG. 4 is decided through a performance simulation of the air conditioning device 10 or an experiment using an actual machine.

In Step S302, a heater core outlet coolant temperature ($T_{HCout}$ (° C.)) that is a temperature of the coolant discharged from the outlet of the heater core is estimated based on an outside air temperature ($T_{ain}$ (° C.)), an output of the AC blower 60, and THCO. In Step S302, $T_{HCout}$ is estimated using the following expression. $T_{ain}$ is detected by an outside air temperature sensor (not shown) provided in the vehicle. In a case where the air conditioning device 10 is used in inside air introduction, $T_{ain}$ may be an air temperature in the vehicle cabin.

$$T_{HCout} = THCO - \frac{KF(THCO - T_{ain})}{\rho C_p V_w}$$

KF in the above-described expression is thermal conductance (W/K) of the heater core 42, $\rho$ is density (kg/m³) of the coolant, $C_p$ is specific heat (J/K/kg) of the coolant, and Vw is allow rate (m³/s) of the coolant of the heater core 42. Since K indicating an absolute temperature is included in the units of KF and $C_p$ in the above-described expression, the units of THCO and $T_{ain}$ should also be set to K. However, in the above-described expression, since the difference between THCO and $T_{ain}$ is calculated in the second term of the right side, the units of THCO and $T_{ain}$ in the term may be ° C. Although the difference between THCO and $T_{ain}$ is multiplied by KF in the unit of W/K in the term, since $C_p$ in the unit of J/K/kg is present in a denominator of the term, K that is present in the units of KF and $C_p$ is cancelled. Accordingly, $T_{HCout}$ is calculated in the unit of ° C. by the above-described expression.

The second term of the right side in the above-described expression indicates how much the temperature of the coolant as a heat source is lowered by the heater core 42. Since the first term of the right side is THCO that is the heater core inlet target coolant temperature, the difference between the first term and the second term of the right side becomes the heater core outlet coolant temperature $T_{HCout}$.

Figure 5:
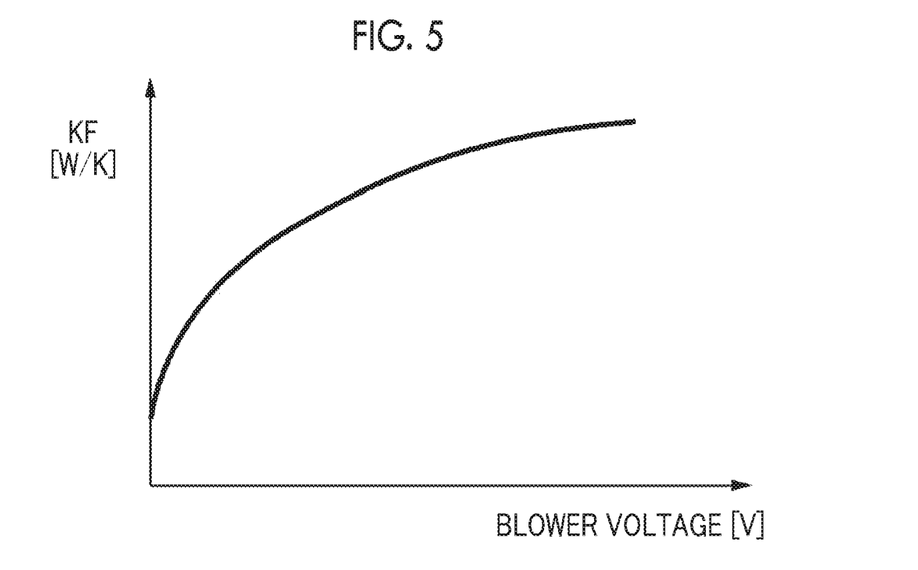
FIG. 5 is a schematic view showing an example of change of thermal conductance of the heater core to a blower voltage as an index of an output of an AC blower.

FIG. 5 is a schematic view showing an example of change of KF to a blower voltage as an index of the output of the AC blower 60. The output of the AC blower 60 changes with the blower voltage that is applied to a motor (not shown) configured to drive the AC blower 60, and KF monotonously increases according to the blower voltage. In Step S302, KF to the blower voltage is calculated using FIG. 5. Since an aspect of change of KF to the blower voltage is different depending on the specification of the air conditioning device 10, an aspect of change of KF to the blower voltage shown in FIG. 5 is decided through a performance simulation of the air conditioning device 10 or an experiment using an actual machine.

In Step S304, determination is made whether or not $T_{HCout}$ estimated in Step S302 is equal to or higher than the FC stack inlet target temperature TFCO. TFCO is, for example, an upper limit of a temperature range optimum for the operation of the FC stack 22. In a case where, in Step S304, $T_{HCout}$ is equal to or higher than TFCO, the procedure progresses to Step S306. In a case where, in Step S304, $T_{HCout}$ is lower than TFCO, the procedure progresses to Step S312.

Figure 6:
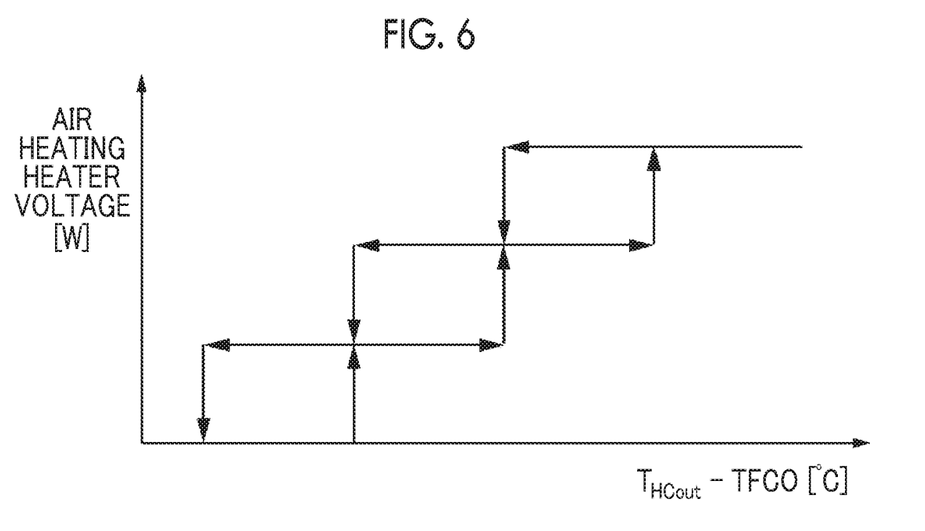
FIG. 6 is a schematic view showing an example of change of electric power of an air heating heater to the difference between a heater core outlet coolant temperature ($T_{HCout}$) and an PC stack inlet target temperature (TFCO)

In Step S306, an output of the air heating heater 64 is calculated based on the difference between $T_{HCout}$ and TFCO. FIG. 6 is a schematic view showing, an example of change of electric power of the air heating heater 64 to the difference between $T_{HCout}$ and TKO. Electric power of the air heating heater 64 may change in a stepwise manner instead of showing a monotonous increase or a monotonous decrease according to the difference between $T_{HCout}$ and TFCO. In Step S306, electric power of the air heating heater 64 to the difference between $T_{HCout}$ and TFCO is calculated using FIG. 6. Since an aspect of change of electric power of the air heating heater 64 to the difference between $T_{HCout}$ and TFCO is different depending on the specification of the air conditioning, device 10, an aspect of change of electric power of the air heating heater 64 to the difference between $T_{HCout}$ and TFCO shown in FIG. 6 is decided through a performance simulation of the air conditioning device 10 or an experiment using an actual machine.

Figure 7:
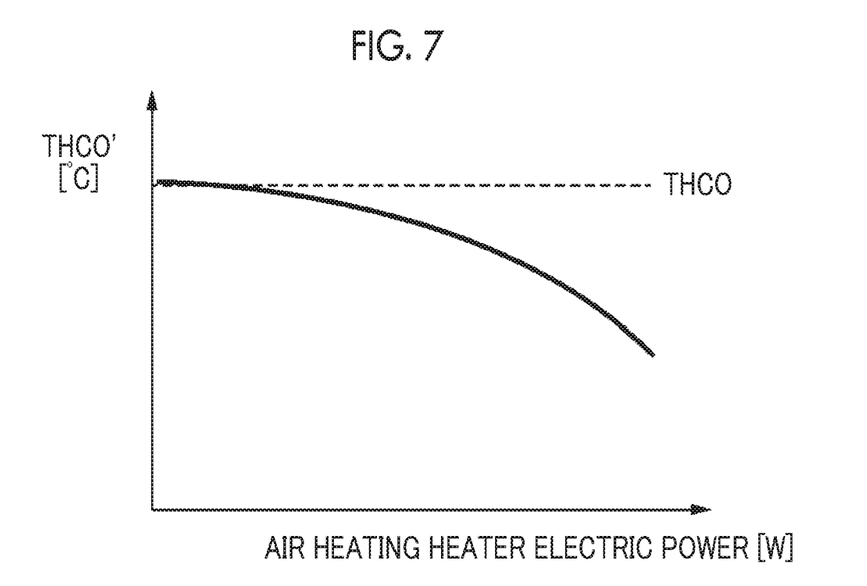
FIG. 7 is a schematic view showing an example of change of a heater core inlet target coolant temperature (THCO') in operation of the air heating heater to electric power of the air heating heater.

In Step S308, a heater core inlet target coolant temperature THCO' in operation of the air heating heater is calculated based on electric power of the air heating heater 64 calculated in Step S306. THCO' becomes lower than THCO since air passing through the heater core 42 is heated by the air heating heater 64. FIG. 7 is a schematic view showing an example of change of THCO' to electric power of the air heating heater 64. In Step S308, THCO' to electric power of the air heating heater 64 is calculated using FIG. 7, Since an aspect of change of THCO' to electric power of the air heating heater 64 is different depending on the specification of the air conditioning device 10, an aspect of change of THCO' to electric power of the air heating heater 64 shown in FIG. 7 is decided through a performance simulation of the air conditioning device 10 or an experiment using an actual machine.

Figure 8:
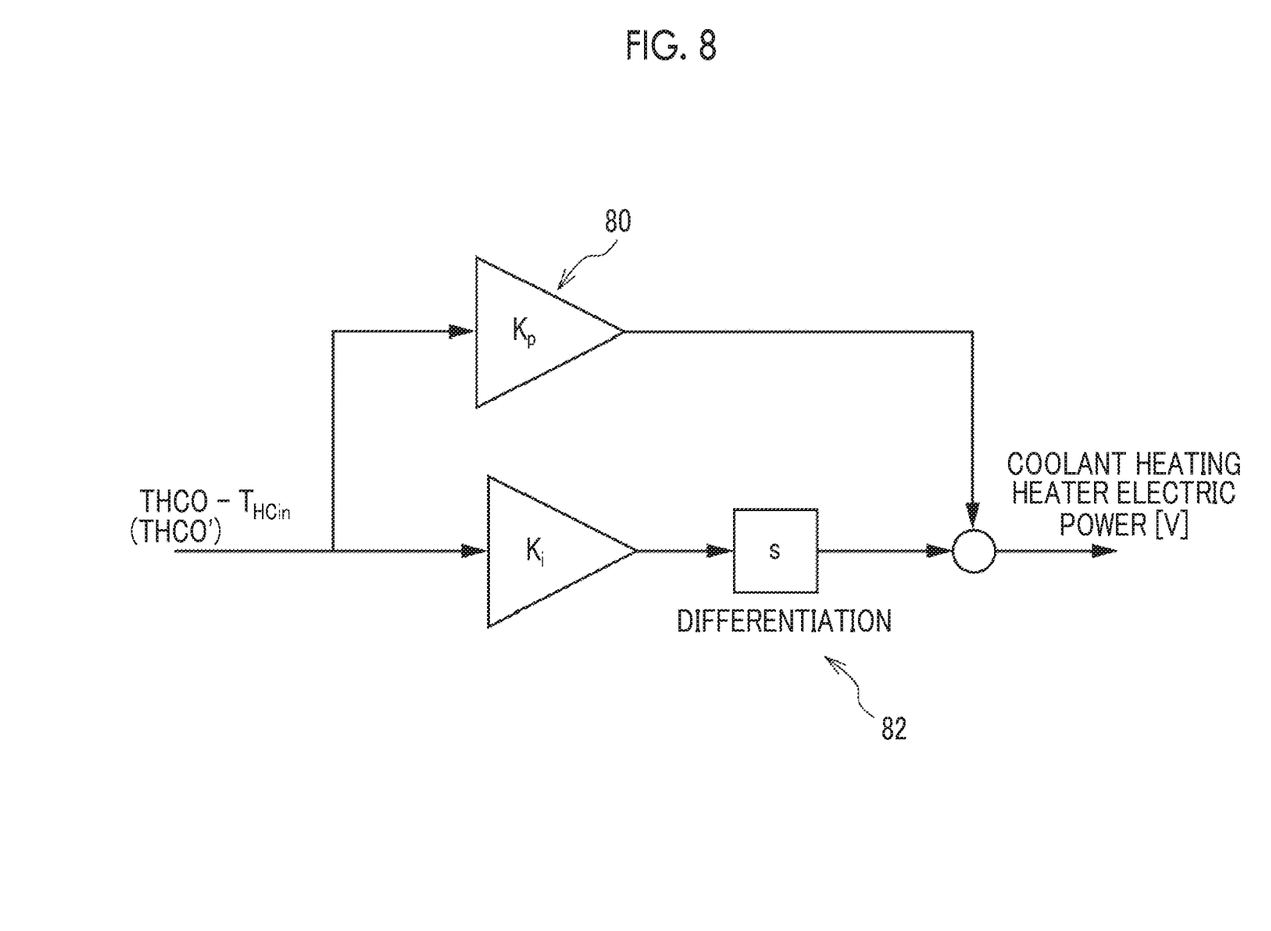
FIG. 8 is a schematic view showing an example of processing for calculating needed electric power of the coolant heating heater based on the difference between the heater core inlet target coolant temperature (THCO') in operation of the air heating heater and a measured value ($T_{HCin}$) of a heater core inlet coolant temperature.

In Step S310, an output of the coolant heating heater 46 is calculated based on THCO' calculated in Step S308 and $T_{HCin}$ as a measured value of a heater core inlet coolant temperature detected by the heater core inlet coolant temperature sensor 48. FIG. 8 is a schematic view showing an example of processing for calculating needed electric power of the coolant heating, heater 46 based on the difference between THCO' and $T_{HCin}$.

Electric power of the coolant heating heater 46 needed in a case where the coolant temperature at the inlet of the heater core 42 is set to THCO' is generally proportional to the difference between THCO' and $T_{HCin}$. In the embodiment, as shown in FIG. 8, proportional control for calculating electric power of the coolant heating heater 46 based on a product obtained by multiplying the difference between THCO' and $T_{HCin}$ by a proportional coefficient $K_p$ in a proportional controller 80 is performed.

However, in the proportional control, in a case where the difference between THCO' and $T_{HCin}$, that is, the amount of change from $T_{HCin}$ as a measured value to THCO' as a target value is large, it may be difficult to accurately calculate electric power of the coolant heating heater 46. For example, in a case where $T_{HCin}$ is, low and the amount of change to THCO' is large, and in a case where the proportional coefficient $K_p$ with which the output of the coolant heating heater 46 could be accurately calculated in a case where $T_{HCin}$ is high and the amount of change to THCO' is small is used, electric power lower than electric power of the coolant heating heater 46 needed in a case where the coolant temperature at the inlet of the heater core 42 is set to THCO' may be calculated.

In the embodiment, differential control by a differential controller 82 is performed in parallel with the proportional control by the proportional controller 80 to calculate electric power of the coolant heating heater 46, in the differential control, a product of a differential value of the amount of change from $T_{HCin}$ as a measured value to THCO' as a target value to time, that is, the magnitude of change of the amount of change and a differential coefficient $K_i$ is used for the amount of change.

In Step S310, an arithmetic result of the differential controller 82 is added to an arithmetic result in the proportional controller 80, thereby calculating electric power of the coolant heating heater 46 and returning the processing.

In a case where, in Step S304, $T_{HCout}$ is lower than TFCO, in Step S312, the output of the coolant heating heater 46 is calculated based on THCO (calculated in Step S300) and $T_{HCin}$ as the measured value of the heater core inlet coolant, temperature detected by the heater core inlet coolant temperature sensor 48 and the processing is returned. Although arithmetic processing in Step S312 is different from Step S310 in that the output of the coolant heating heater 46 is calculated using THCO, other portions are the same as Step S310, and the output of the coolant heating heater 46 is calculated by the proportional controller 80 and the differential controller 82 shown in FIG. 8.

In a case where the coolant heating heater 46 is operated with the output calculated in Step S310 or S312, the coolant discharged from the heater core 42 is introduced into the radiators 24, 26 through the radiator valve 34, and is cooled to the temperature range optimum for cooling the FC stack 22.

As described above, with the air conditioning device 10 for a fuel cell vehicle according to the embodiment, in a case where the target blowing temperature (TAO) such that the heater core outlet coolant temperature ($T_{HCout}$) estimated based on the target blowing temperature (TAO) becomes equal to or higher than the FC stack inlet target temperature (TFCO) is high, the air heating heater 64 having more excellent heat efficiency than the coolant heating heater 46 is operated, and a shortage of heating by the coolant of the FC stack 22 and the air heating heater 64 is supplemented by the operation of the coolant heating heater 46, whereby it is possible to heat the inside of the vehicle cabin in a state where the energy efficiency of the vehicle is excellent.

In the air conditioning device 10 for a fuel cell vehicle according to the embodiment, in a case where the target blowing temperature (TAO) such that the heater core outlet coolant temperature ($T_{HCout}$) estimated based on the target blowing temperature (TAO) becomes lower than the PC stack inlet target temperature (TFCO) is low, control for performing for operating the coolant heating heater 46 while prohibiting the operation of the air heating heater 64 causing an increase in a load of the air conditioning device 10, whereby the reliability of the au conditioning device 10 for a fuel cell vehicle is secured.

In the air conditioning device 10 for a fuel cell vehicle according to the embodiment, the difference between the heater core inlet target coolant temperature (THCO) and the measured value ($T_{HCin}$) of the heater core inlet coolant temperature detected by the heater core inlet coolant temperature sensor 48 is subjected to the proportional control and the differential control, whereby it is possible to set the output of the coolant heating heater with high accuracy.

In the configurations of the appended claims, a coolant passage corresponds to the PC cooling circuit 20 and the heater circuit 40, a fuel cell corresponds to the FC stack 22, an air conditioning set temperature corresponds to the target blowing temperature (TAO), an estimated temperature of the coolant at a coolant outlet of a heater core corresponds to the heater core outlet coolant temperature ($T_{HCout}$), a target temperature of the coolant at a coolant inlet of the fuel cell corresponds to the PC stack inlet target temperature (TFCO), a target temperature of the coolant at a coolant inlet of the heater core corresponds to the heater core inlet target coolant temperature (THCO), a controller corresponds to the vehicle ECU 12, an outside air temperature corresponds to the outside air temperature ($T_{ain}$), a blower corresponds to the AC blower 60, and a coolant temperature sensor corresponds to the heater core inlet coolant temperature sensor 48.

What is claimed is:

1. An air conditioning device for a fuel cell vehicle, the air conditioning device comprising:
   a fuel cell configured to be cooled by a coolant circulating in a coolant passage;
   a heater core provided on the coolant passage and configured to heat air in a vehicle cabin with the coolant discharged from the fuel cell as a heat source;
   a coolant heating heater provided on the coolant passage between the fuel cell and the heater core and configured to heat the coolant;
   an air heating heater configured to further heat the air heated by the heater core; and
   a controller configured to, in a case where an estimated temperature of the coolant at a coolant outlet of the heater core based on an air conditioning set temperature is equal to or higher than a target temperature of the coolant at a coolant inlet of the fuel cell, perform control such that the air heating heater is operated with an output set based on the estimated temperature of the coolant at the coolant outlet of the heater core, and the coolant heating heater is operated with an output set based on the target temperature of the coolant at the coolant inlet of the heater core calculated according to the set output of the air heating heater.

2. The air conditioning device according to claim 1, wherein the controller is configured to, in a case where the estimated temperature of the coolant at the coolant outlet of the heater core is lower than the target temperature of the coolant at the coolant inlet of the fuel cell, perform control such that the coolant heating heater is operated with an output set based on the target temperature of the coolant at the coolant inlet of the heater core calculated based on the air conditioning set temperature.

3. The air conditioning device according to claim 1, wherein the controller is configured to estimate the estimated temperature of the coolant at the coolant outlet of the heater core based on the target temperature of the coolant at the coolant inlet of the heater core calculated based on the air conditioning set temperature, an outside air temperature, and an output of a blower of the air conditioning device.

4. The air conditioning device according to claim 1, wherein the controller is configured to process a difference between the target temperature of the coolant at the coolant inlet of the heater core and a temperature of the coolant at the coolant inlet of the heater core detected by a coolant temperature sensor through proportional control and differential control to set an output of the coolant heating heater.

* * * * *